United States Patent [19]

Hamasaki et al.

[11] 4,399,514
[45] Aug. 16, 1983

[54] METHOD OF INSPECTING INTERNAL PRESSURES IN SEALED CONTAINERS

[75] Inventors: Mikihiko Hamasaki, Kawanishi; Kozo Oba, Izumi, both of Japan

[73] Assignee: Hitachi Shipbuilding & Engineering Co., Ltd., Osaka, Japan

[21] Appl. No.: 218,770

[22] Filed: Dec. 22, 1980

[30] Foreign Application Priority Data

Dec. 26, 1979 [JP] Japan ................................. 54-173724
Jul. 10, 1980 [JP] Japan ................................. 55-94790
Oct. 24, 1980 [JP] Japan ................................. 55-149967

[51] Int. Cl.³ ........................... G01L 9/10; G01M 3/36
[52] U.S. Cl. ....................................... 364/558; 73/52; 364/508
[58] Field of Search .................... 364/508, 558; 73/52, 73/579, 659, 668; 324/207

[56] References Cited

U.S. PATENT DOCUMENTS

| | | | |
|---|---|---|---|
| 4,187,718 | 2/1980 | Shibasaki | 364/558 |
| 4,223,790 | 9/1980 | Yoshida | 73/52 |
| 4,243,932 | 1/1981 | Kakumoto et al. | 73/52 |
| 4,313,171 | 1/1982 | Shibasaki | 364/558 |

*Primary Examiner*—Errol A. Krass
*Attorney, Agent, or Firm*—Darby & Darby

[57] ABSTRACT

A nondestructive method for inspecting internal pressures of sealed containers wherein a magnetic impulsive force is impinged upon a metallic surface of the container and the resulting vibration of the metallic surface is detected. The detected signal is applied to a plurality of band-pass filters from which the fundamental and harmonics are extracted. The two highest level signals extracted from the band-pass filters, designated the fundamental and a harmonic, are selected, which signals are analyzed by comparison to predetermined values for level and frequency and for their ratio of their levels with respect to one another. A judgment as to the integrity of the sealed container may be made based upon the deviation from the aforesaid predetermined values.

3 Claims, 30 Drawing Figures

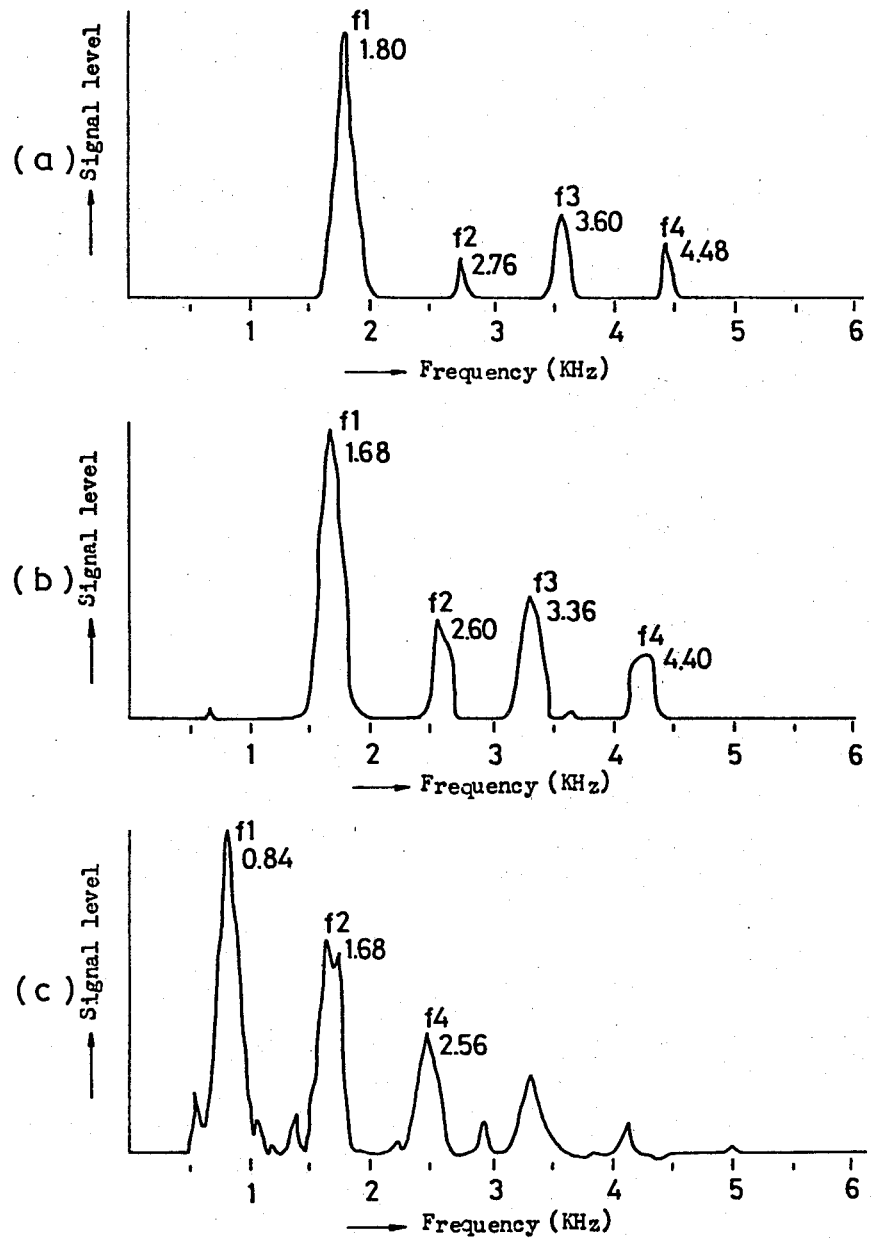

$p \leq \dfrac{D}{5}$

METHOD OF INSPECTING INTERNAL PRESSURES IN SEALED CONTAINERS

FIELD OF THE INVENTION

The present invention relates to a method of inspecting the internal pressures in sealed containers, according to which a magnetic impulsive force is exerted a metallic end surface of each sealed container, for example a metallic lid of a can; vibration of the metallic lid generated by such impulsive force is detected electromagnetically or acoustically; such vibration of the metallic lid is supplied, as an electric signal, to a plurality of band-pass filters; a fundamental frequency signal and a higher harmonic signal is extracted; and the internal pressure in the sealed container is detected by the extracted signals in a nondestructive manner, so that defective sealed containers having insufficient or excessive pressures may be detected.

BACKGROUND OF THE INVENTION

Generally speaking, in order to preserve the quality of the contents in hermetically sealed containers such as canned provisions, such containers have therein gaps and have negative or positive pressures. Accordingly, the air-tightness in sealed containers such as beverage cans may be effectively determined in a nondestructive manner by inspecting their internal pressures.

There is conventionally known a manual hammering inspection method, according to which the top surface of a sealed container is gently striken manually with a rod-shape hammer and thus generated vibration is checked based on the sound, reaction and eye measurement, so that airtightness is judged. However, it requires much skill and patience to preform quickly and accurately the inspection of a large number of sealed containers according to such a manual hammering inspection method.

On the other hand, in a sealed container having a negative pressure, there is a case where the inflow of the outside air through small scratches or holes formed at the time the container is charged with contents or hermetically sealed, is slowly advanced with the passage of one or two weeks, and provokes a slow pressure leak phenomenon, resulting in an excessively decreased pressure of a zero pressure in the container. There is also a case where, by the change in quality of the contents in a container with the passage of time, the internal pressure which should normally be a negative pressure becomes a positive pressure and subsequently such container is expanded. However, it is very difficult to find such a slow pressure leak or can expansion phenomenon immediately after the container has been charged with contents and hermetically sealed.

A conventional manual hammering inspection after the passage of a predetermined period of time is performed in such a manner that containers charged and hermetically sealed are first housed in cases and such cases are stored and preserved for a predetermined period of time, after which the containers taken out from the cases are subjected to the hammering inspection. Thereafter, the containers are again housed in the cases and the cases are again closed, thus requiring much labor with the possibility of the breakage of cases and/or the damages of containers accompanied. Thus, such conventional manual hammering inspection is very inconvenient.

There is also known a mechanical automatic inspection method, according to which a pulsated electromagnetic force is generally exerted to the lid of each can to generate vibration on the can lid. From the fact that the relationship between the fundamental vibration frequency of vibration sound and the pressure of the article to be inspected becomes as shown in FIG. 1, the natural damped vibration of the lid is detected acoustically or electromagnetically, and a signal obtained from such detection is passed through filters. Then, it is checked whether or not a predetermined frequency band width of the electric signal passed through the filters is within a predetermined frequency range, and also the level of a signal generated by the fundamental vibration is checked, whereby the can container is judged as good or defective.

However, there is a case where the acoustic judgment is affected by the external noise conditions, so that the inspection quality is decreased.

Furthermore, can containers judged as defective include containers having insufficient negative pressures or atmospheric pressures in which the originally normal internal pressures have leaked due to the insufficiency of the charging temperature or the imperfect integration of can lids with can main bodies, and also include deformed or expanded containers of which internal pressures have become positive pressures for some reasons.

The wave-form characteristics of electric signals actually obtained from good and defective can containers are shown in FIGS. 2 and 3, in which the frequency is taken on the abscissa in a uniform scale and the signal level is taken on the ordinate in a logarithmic scale.

FIG. 2 (a) illustrates the wave-form obtained from a good can container of which internal pressure is a predetermined negative pressure. FIG. 2 (b) illustrates the waveform obtained from a can container of which internal pressure is decreased in the vicinity of the standard lower limit. FIG. 2 (c) illustrates the wave-form obtained from a can container having no internal pressure.

FIG. 3 (a) to (c) illustrate the wave-forms obtained from expanded can containers which have been insufficiently sealed due to defective integration of can lids with can bodies and their internal pressures become positive pressures. FIG. 3(a) illustrates the wave-form obtained from a can container of which internal pressure is relatively low. FIG. 3(b) illustrates the wave-form obtained from a can container of which the absolute value of internal pressure is equivalent to the internal pressure of a good can container. FIG. 3(c) illustrates the wave-form obtained from an expanded can of which internal pressure is further increased in the vicinity of the can breaking pressure.

In FIGS. 2 and 3, the highest levels and the subsequent levels of signals generated by the fundamental vibration are continuously plotted and the corresponding frequencies are designated as f1, f2, f3 and f4, respectively, from the lowest frequency. Then, multipliers $\alpha$ of 2 to 3 are obtained from the relationship of the frequencies f4 with respect to the frequencies f1, respectively. Namely, where the signals at the frequencies f1 are designated as fundamental frequency signals and the signals at the frequencies around the "f1×$\alpha$" are designated as higher harmonic signals, it is theoretically possible to judge from the relationship between the fundamental frequency signals and the higher harmonic signals, that a certain can container is one shown in FIG.

2 or an expanded can shown in FIG. 3. The appropriateness of such judgment is proved from other similar data.

However, according to a conventional inspection method, distinction between the fundamental frequency signal and the higher harmonic signal has not been made, and therefore there has been a case where an expanded can cannot be distinguished from a good can having a normal negative pressure. Thus, such conventional inspection method lacks the reliability.

When the second largest level signal subsequent to the fundamental frequency signal is present at the frequency f2, the level of the fundamental frequency signal is affected by the inspection timing, so that the inspection result may become inaccurate. It is therefore necessary to allow a sufficient tolerance for the limit of good can container, thus further decreasing the reliability of the inspection.

It is also found from a large number of data that the signal level at the lowest frequency f1 is not always higher than the signal level at the second lowest frequency f2. This means such inspection method includes an inaccurate factor and therefore highly accurate inspection cannot be expected.

When a great number of sealed containers such as cans are arranged in a case for example in a corrugated cardboard box and the internal pressures of such sealed containers as housed in the case are externally inspected, it is necessary to accurately detect and inspect the center portions of the lids of such sealed containers. However, the sealed containers are not always arranged in accurate position in line in the box, but in most cases it seems they are positionally shifted. When such positionally shifted containers are vibrated with a pulsated electromagnetic force exerted to the portions thereof apart from the centers, their detected wave-forms become different from those detected along the vertical lines extending from the accurate centers of the sealed containers. In consequence, such inspection may produce an erroneous judgment, thus causing the inspection accuracy to be lowered.

With respect to such positional shifting, wave-forms obtained at the time of inspection of a non-gaseous drink can, are shown by way of example.

FIG. 4 illustrates the wave-forms obtained from a can of which internal pressure is a normal negative pressure. FIG. 4(a) illustrates the wave-form detected at a position on the portion 10 mm apart from the can lid center, FIG. 4(b) illustrates the wave-form detected at a position on the portion 5 mm apart from the can lid center, and FIG. 4(c) illustrates the waveform detected at a position on the can lid center.

FIG. 5 illustrates the wave-forms obtained from a defective can of which internal pressure is zero or equal to the atmospheric pressure. FIGS. 5(a), (b) and (c) illustrate the wave-forms detected at positions 10 mm, 5 mm and 0 mm apart from the lid center of the same defective can, respectively.

In comparison of FIG. 4 with FIG. 5, the frequencies f1 exhibiting the fundamental frequency signals having the highest level are constant regardless of the positional shifting. Therefore, such wave-forms may be used as inspection data of the can internal pressures. However, the level of signals other than the fundamental frequency signal, for example the level of the signal at the frequency f2, varies with the respective distances between the inspected positions and the lid centers.

FIG. 6 illustrates the wave-forms detected from an expanded can of which internal pressure which should normally be a negative pressure, becomes a positive pressure for some reason. The absolute value of the internal pressure in the can shown in FIG. 6 is the same as that of the can shown in FIG. 4, and in FIG. 6 the fundamental frequency signals are located at the similar frequencies in the case of FIG. 4. As the consequence, there is a possibility of the internal pressure of the can in FIG. 6 being judged as normal. Therefore, the can in FIG. 6 may be regarded as good one, although it should absolutely be detected as defective one.

As shown in FIG. 6, the expanded can has a characteristic that the higher harmonic signal level at the frequency f4 becomes extraordinary high when inspection is performed on the center of the can lid. However, as shown in FIG. 6(a) and (b), when inspection is performed on the portions apart from the center of the can lid, the higher harmonic signal levels vary with the respective distances between the inspected positions and the can lid center in substantially inverse proportion, and there is a case where the higher harmonic signal disappears. Accordingly, judgment of whether a certain can has an excessive pressure or has a normal negative pressure may become inaccurate dependent on the positional shift of the can potentially taken place in the can storing case.

Accordingly, it is apparently necessary to perform the inspection of the can as not positionally shifted in the case. However, it is not easy to detect accurately the center positions of the lids of a large number of cans arranged in the case. Practically, there is applied an indirect inspection method, according to which the bodies of the cans arranged at the both ends of the case are magnetically detected and the positions of the cans arranged at the inner part of the case are supposed, or the outer surfaces of the case are detected and the can positions in the case are calculated. However, in any case, no accurate position detection may be performed.

DISCLOSURE OF THE INVENTION

The present invention relates to a method of inspecting the internal pressures of sealed containers.

The method in accordance with the present invention comprises the steps of:

exerting an impulsive force to a metallic end surface of each sealed container;

detecting vibration of the end surface of the sealed container generated by such impulsive force, by means of each vibration detector;

supplying the electric signal given out from the detector, to band-pass filters in which the adjacent frequencies in the respective band widths are overlapped or at least consecutive;

comparing the levels of output signals of the respective band-pass filters with one another;

selecting two filters through which signals having the highest and second highest levels based on such comparison, have passed;

designating the signal which has passed through the filter having a lower frequency out of said two filters, as a fundamental frequency signal;

selecting the filter having a frequency equivalent to a value obtained by multiplying the frequency of the fundamental frequency signal by a specific numeral from 2 to 3;

designating the signal which has passed through said last-mentioned filter, as a higher harmonic signal; and judging the sealed container as defective when the fundamental frequency signal and the higher harmonic signal are applicable to at least one of following conditions;
  (a) the level of the fundamental frequency signal is lower than a predetermined standard level;
  (b) the frequency of the fundamental frequency signal deviates from a predetermined frequency range; and
  (c) the ratio of the higher harmonic signal level to the fundamental frequency signal level is larger than a predetermined standard ratio.

BRIEF DESCRIPTION OF THE DRAWINGS

The invention is further described, by way of example, with reference to the accompanying drawings, in which:

FIG. 2 and FIG. 3 illustrate the wave-forms of electric signals obtained from the vibrations generated on the lids of the sealed containers or cans;

FIG. 2(a) and (b) illustrating the wave-forms obtained from a good can, FIG. 2(c) illustrating the wave-form obtained from a can having no negative pressure, and FIG. 3(a), (b) and (c) illustrating the wave-forms obtained from an expanded can;

FIGS. 4(a), 4(b) and 4(c) illustrating the wave-form obtained from a good can, FIGS. 5(a), 5(b) and 5(c) and FIGS. 6(a), 6(b) and 6(c) illustrating the wave-forms obtained from defective cans, (a) to (c) in FIG. 4 to FIG. 6 illustrating the wave-forms with an electromagnetic force exerted to the portions 10 mm, 5 mm and 0 mm apart from the centers of the same cans, respectively;

FIG. 11(a) illustrating the wave-form of a pulse signal, FIG. 11(b) illustrating the wave-form of a pulse current, FIG. 11(c) illustrating the wave-form of magnetism of the magnetic core, FIG. 11(d) illustrating the wave-form of natural damped vibration, FIG. 11(e) illustrating the wave-form of an electric signal, and FIG. 11(f) illustrating the wave-form of a natural signal;

DETAILED DESCRIPTION OF PREFERRED EMBODIMENTS

The description hereinafter will discuss an embodiment of the method in accordance with the present invention with reference to FIGS. 7 to 13, where a sealed container is judged as a good one when its internal negative pressure is within a predetermined range.

Figure 9:
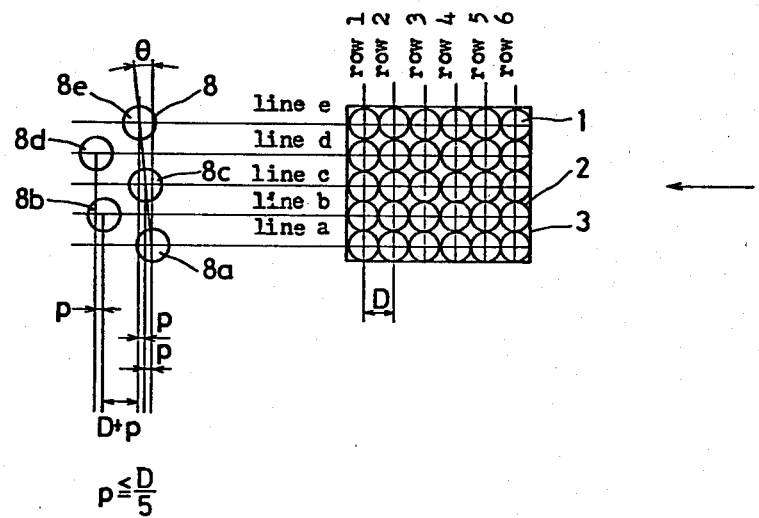
FIG. 9 is a schematic view illustrating the arrangement of cans and vibration detectors in FIG. 7.

Each of sealed containers or cans 2 has a metallic end surface 1 and is to be judged as a normal one when its internal negative pressure is within a predetermined range. As shown in FIG. 9, the cans 2 of the same kind are housed in a case 3 with five cans arranged in each of six rows therein. Namely, six cans are arranged in each of the lines (a) to (e); that is, thirty cans 2 are totally housed in each case 3. In FIG. 9, D represents a distance equal to the outer diameter of the can 2.

Figure 7:
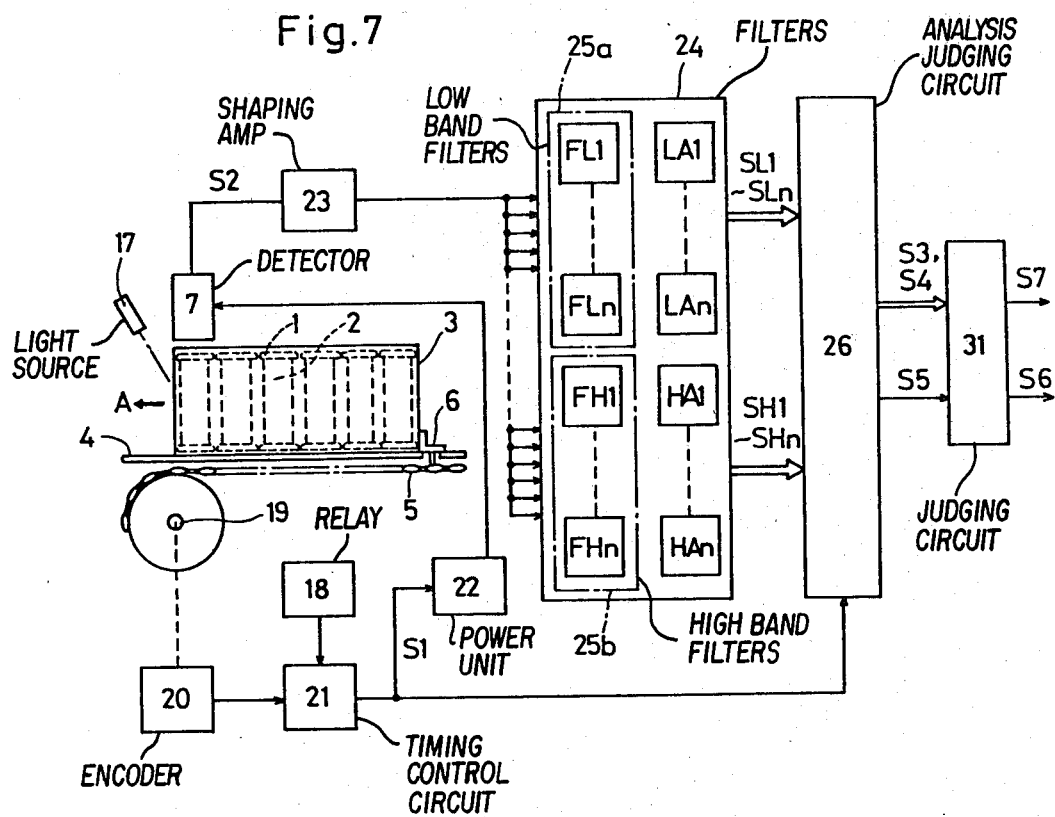
FIG. 7 is a schematic structural diagram of an embodiment of a method of inspecting the internal pressures of sealed containers in accordance with the present invention.

As shown in FIGS. 7 and 9, the respective cases 3 are conveyed in the direction of the arrow A on a slide plate 4 of a conveyor system such that the respective cases 3 don't come in contact with their adjacent cases by a mangle 6 connected to a drive chain 5, and the cases 3 then reach a detector unit 7 disposed on the slide plate 4.

As shown in FIG. 9, the detector unit 7 has vibration detectors 8 of the same number as the number of the cans 2 arranged in the first row, namely five detectors in this example, which are arranged in the zigzag shape in a frame 9. Each of these detectors 8 is arranged with the inclination angle $\theta$ with respect to the longitudinal arranging direction of the cans 2 such that so-called synchronous points where the axes of the vibration detectors 8 are aligned with the axes of the cans 2 in the moving case 3, independently reach in succession the respective vibration detectors 8, with the movement of the case 3.

In FIG. 9, p represents the pitch or distance between the centers of the cans 2 in the case moving direction, and p is equal to or smaller than D/5.

Figure 10:
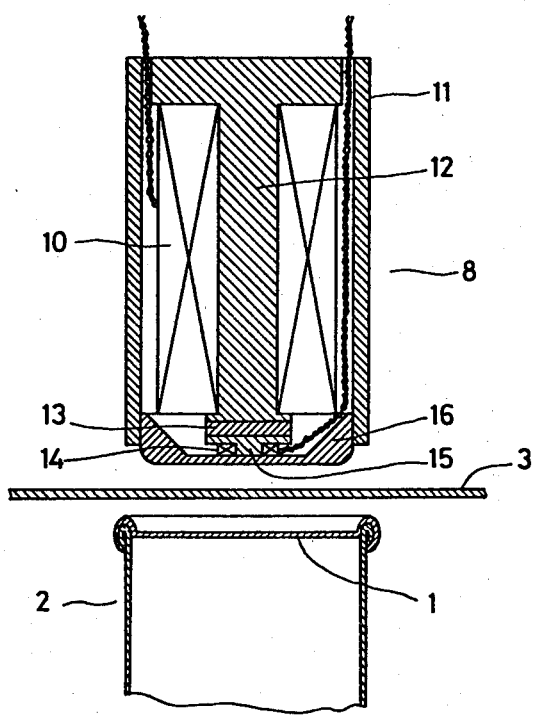
FIG. 10 is a schematic structural diagram of the vibration detector in FIG. 7.

Each of the vibration detectors 8 is constructed as shown in FIG. 10.

In FIG. 10, an exciting coil 10 is disposed so as to be positioned on the end surface 1 of the can 2 and an iron core 11 has a magnetic core 12 for the exciting coil 10. A permanent magnet 13 is disposed at the lower end of the magnetic core 12. A search coil 14 is disposed for detecting the change in the magnetic flux due to the vibration of the end surface 1, and is wound on a search coil magnetic core 15 disposed at the lower end of the magnet 13. A cap 16 is fitted into the inside of the lower end of the iron core 11 and holds the magnetic core 15 wound on the search coil 14 and the permanent magnet 13.

When the case 3 reaches the vibration detector unit 7, the projecting beam from a position detector light source 17 is interrupted, as shown in FIG. 7. Then, a photoelectric relay 18 is operated and a pulse is given out from a pulse transmitting encoder 20 connected to a sprocket 19 of the drive chain 5. Then, by such a pulse, a pulse signal S1 representing the start of inspection is given out from a timing control circuit 21 as shown in FIG. 11(a).

Figure 11:
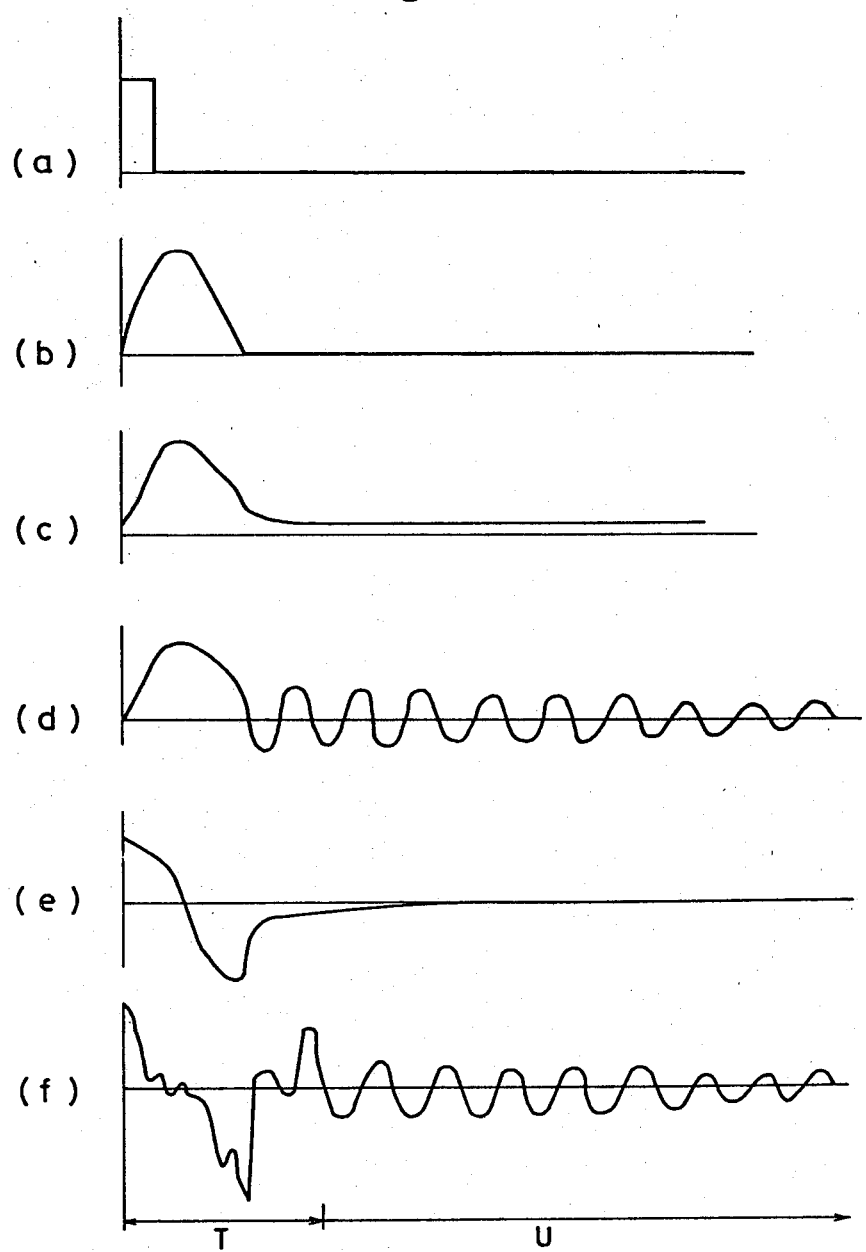
FIG. 11 illustrates the wave-forms obtained from the portions in FIG. 10.

That is, when the can 2 of the row 1 on the line a arrives at or around the synchronous position where the axis of such can 2 is aligned with the axis of first vibration detector 8a in the vibration detector unit 7, the circuit 21 gives out one or a plurality of pulses S1 in succession to the vibration detector 8a. Thereafter, one of the vibration detectors 8a to 8e corresponding to another can 2 in the case 3 is selected synchronous to the pitch p in the respective vibration detectors 8 shown in FIG. 9, and one or a plurality of pulses S1 are given out to the selected vibration detector in succession. Thereafter, such operation is repeated for all cans 2 in the case 3.

Where a pulse signal S1 is given out one time to one selected can 2, such pulse signal S1 is supplied to a pulse generation power unit 22. When the pulse signal S1 is supplied to the pulse generation power unit 22, a single pulse current is supplied to the exciting coil 10 as shown in FIG. 11(b). When the pulse current is flowed in the exciting coil 10, magnetism as shown in FIG. 11(c), is generated in the magnetic core 12 of the exciting coil 10. By such magnetism, the end surface 1 is subjected to a pulsed electromagnetic impulsive force and therefore a natural damped vibration, as shown in FIG. 11(d), is generated on the end surface 1. The magnetic flux generated by the permanent magnet 13, disposed between the magnetic core 12 and the end surface 1, passes through the search coil 14 while such magnetic flux is affected by the natural damped vibration of the end surface 1. Therefore, as shown in FIG. 11 (e), an electric signal S2, including a natural signal generated by the natural damped vibration of the end surface 1, is generated and such electric signal S2 is represented by the following equation:

$$S2 = N\frac{d\phi}{dt} \ (V)$$

where
N: the number of turns of the search coil 14
$\phi$: the magnetic flux passing through the search coil 14

Then, the electric signal S2 of the search coil 14 is supplied to a wave-form shaping amplifier circuit 23 through which only the natural signal generated by the natural damped vibration of the end surface 1 passes, and only the natural signal is extracted and amplified as shown in FIG. 11(f).

In FIG. 11(f), the zone T is a transient response portion and the zone U is a portion where response is satisfactorily made with respect to the natural damped vibration of the end surface 1.

Figure 12:
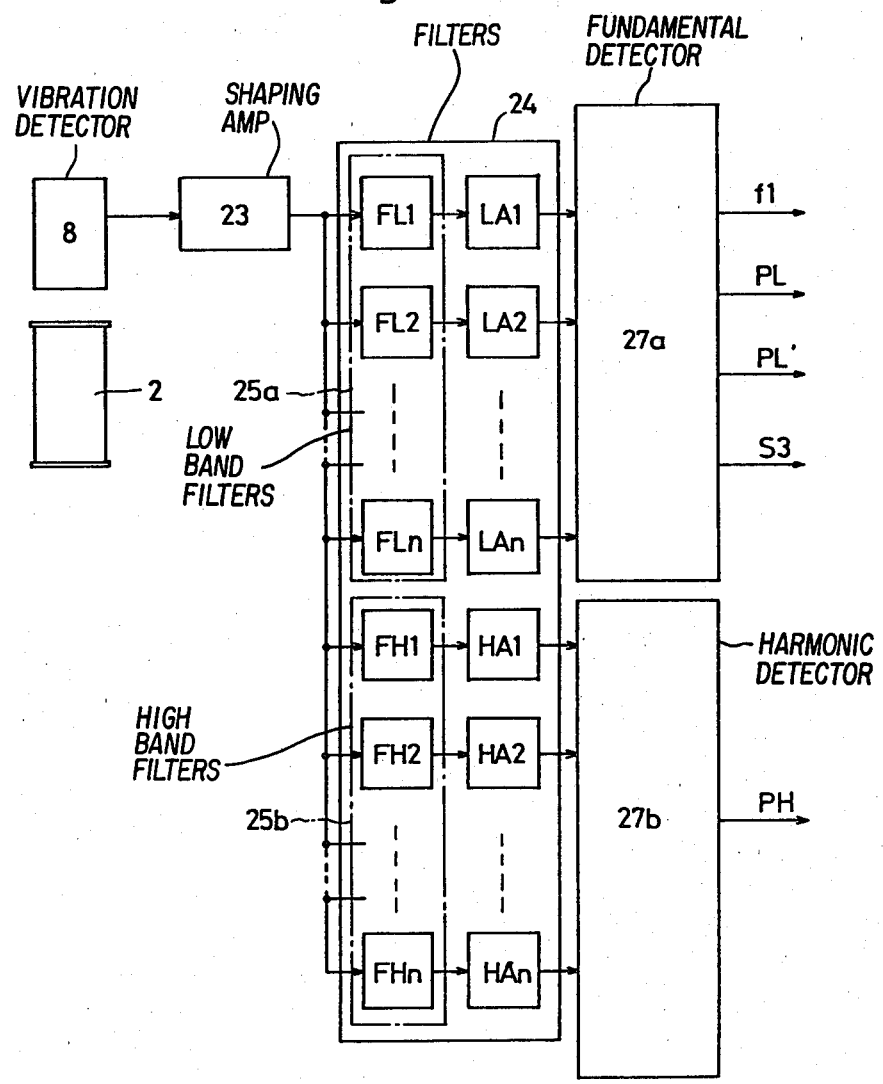
FIG. 12 is a block diagram of a filter device in FIG. 7.

As shown in FIG. 12, the above-mentioned signal amplified by the wave-form shaping amplifier circuit 23 is supplied in parallel to a low-pass frequency filter group 25a comprising low-band-pass filters FL1 to FLn and a high-pass frequency filter group 25b comprising high-band-pass filters FH1 to FHn, of the filter unit 24, respectively. These low- and high-band-pass filters are arranged such that their adjacent frequencies are overlapped or at least consecutive to each other.

Since a vibration signal within a predetermined band width can pass through each band-pass filter, the output signal of each filter becomes a signal formed with predetermined frequency components of the natural signal separated and filtered. At the same time, the frequency value is obtained from each filter.

The signals damped by these filters are amplified by level amplifiers LA1 to LAn and HA1 to HAn and then supplied to an analysis judging device 26 (in FIG. 7).

Figure 13:
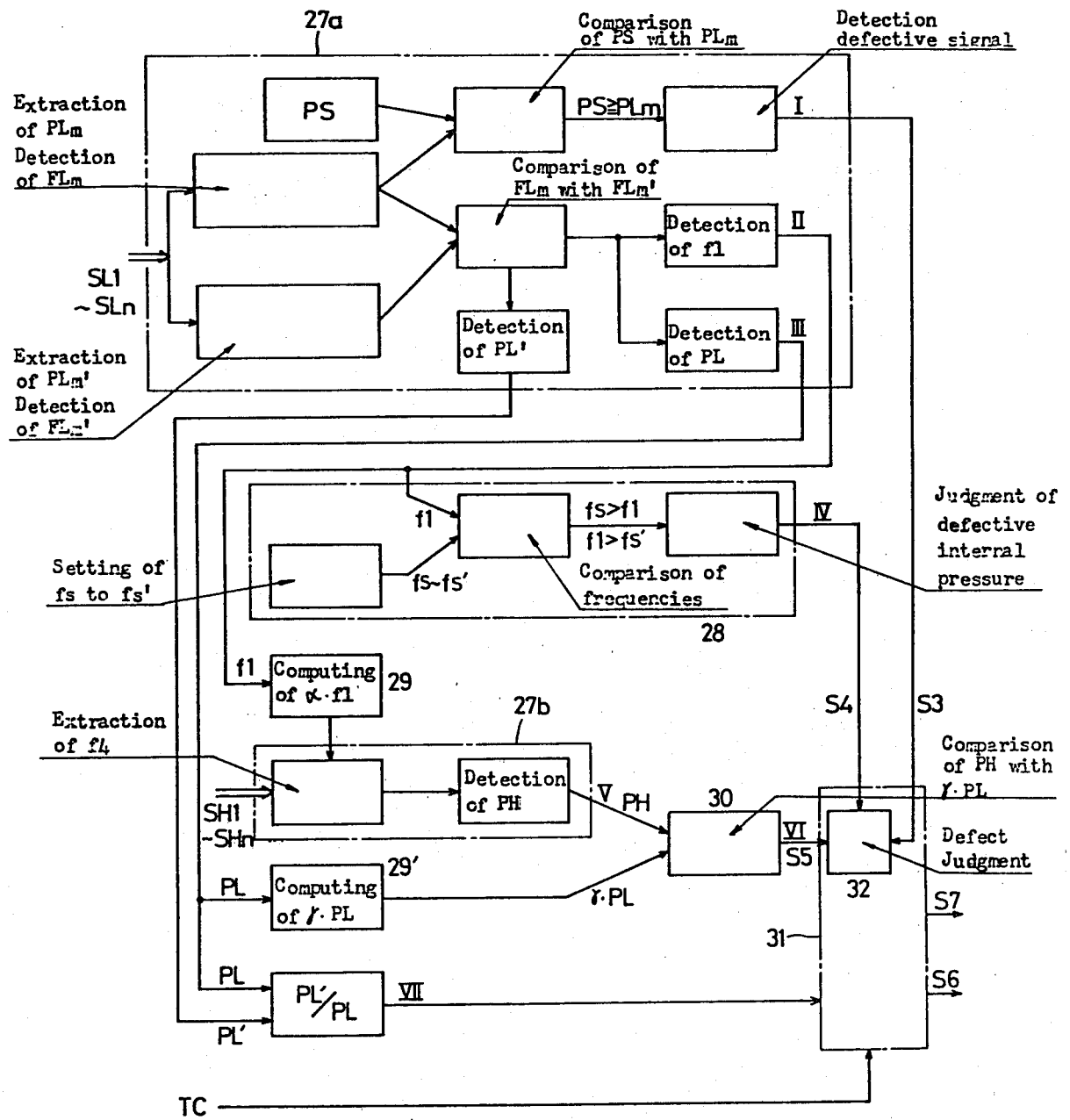
FIG. 13 is a schematic diagram illustrating the structure and the operation of an analysis judging device in FIG. 7.

Namely, as shown in FIG. 13, the signals SL1 to SLn given out from the level amplifiers LA1 to LAn are supplied to a fundamental frequency component detector 27a and the output signals of the level amplifiers LA1 to LAn are compared in level with one another. Then, a signal having the highest level PLm and a signal having the second highest level PLm' are extracted and the corresponding frequencies FLm and FLm' are detected.

At the step I, the highest level PLm is compared with the standard level PS. When the highest level PLm is equal to or smaller than the standard level PS, there is sent a detection signal S3 representing the upside-down arrangement of the can, the deformation of the lid and/or a shortage of the inspection signal due to the full charge of contents in the can.

When the highest level PLm is larger than the standard level PS, the frequency FLm is compared with the frequency FLm'. Then, at the step II, a signal having a lower frequency is extracted and the thus extracted signal is designated as the fundamental frequency f1. At the step III, the level of such signal is detected as PL.

When only one high level signal is detected, such signal is regarded as the fundamental frequency signal f1 and its level as PL.

The fundamental frequency signal is supplied to a fundamental frequency judging circuit 28 and the frequency f1 of the fundamental frequency signal is checked whether it is in a predetermined frequency range, that is, the normal internal pressure frequency range fs to fs'. If such frequency f1 deviates from the normal frequency range, the can is judged as a defective can having an insufficient internal pressure or an expanded deformed can. Then, at the step IV, a defection signal S4 indicative of a defect is sent.

When the frequency f1 is in the normal frequency range, the multiplication of the frequency f1 by $\alpha$ ($\alpha=2.0$ to 3.0) is performed by a frequency computing circuit 29, and the computed result is given out to a higher harmonic component detector 27b, where the signal at the frequency "$\alpha \cdot f1$" is extracted out of the signals of the level amplifiers HA1 to HAn. Such signal is designated as a higher harmonic signal at the frequency f4. At the step V, the level of this signal is detected as PH.

By a level setting circuit 29' to which the fundamental frequency signal having the level PL is supplied, the fundamental frequency signal level PL is multiplied by a specific multiplying rate $\gamma$ (a decimal fraction), and by a level comparing circuit 30, the higher harmonic signal level PH is compared with "$\gamma \cdot PL$". When the higher harmonic signal level PH is smaller than $\gamma \cdot PL$ at the step VI, the can is judged as good. When the higher harmonic signal level PH is larger than "$\gamma \cdot PL$", a signal S5 is sent out.

Figure 8:
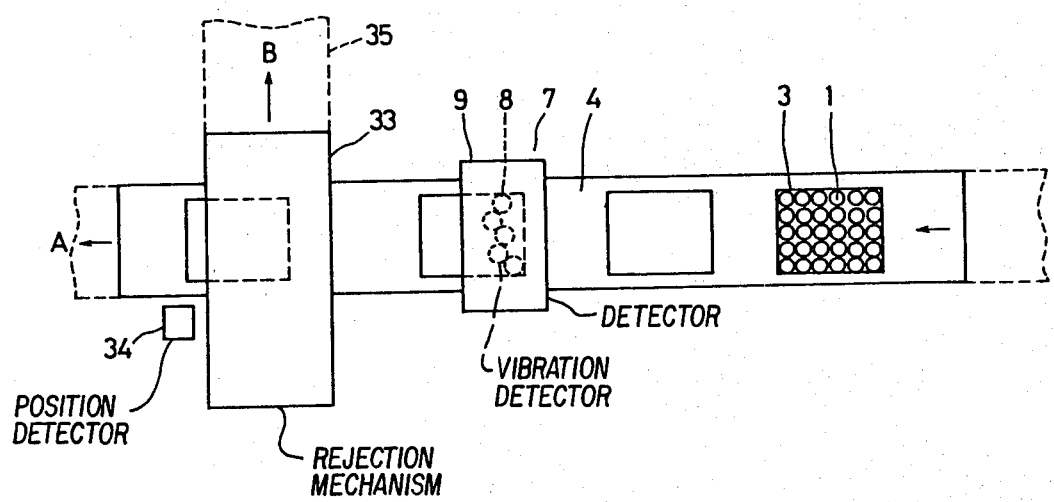
FIG. 8 is a plan view of a conveyor system in FIG. 7.

When the defection signal S3 of the fundamental frequency component detector 27a, the defect indicating signal S4 of the fundamental frequency judging circuit 28, or the output signal S5 of the level comparing circuit 30 is supplied to the defect judging portion 32 of an overall judging circuit 31, defect judgement is made by the overall judging circuit 31 and a display signal S6 based on such defect judgement is given out to a display device (not shown). At the same time, a rejection signal S7 is given out to a rejection mechanism 33 (FIG. 8). When the case 3 housing the cans 2 to which defection judgement has been made, arrives at the rejection mechanism 33, a case position detector unit 34 including a photoelectric switch and a limit switch detects such arrival and gives out a detection signal, by which the case 3 is rejected to a rejection path 35 in the direction of the arrow B in FIG. 8.

The respective cans 2 are not always arranged at accurate positions in line in the case 3, but rather they are generally positionally shifted. In this connection, in order to prevent erroneous detection due to such positional shift, provision is made so as to minimize a detection position error with respect to the case moving direction.

Namely, a pulse signal S1 is given out several times for example three times from the timing control circuit 21 to a selected one of the vibration detectors 8a to 8e, thereby to inspect the substantial center of the end surface 1 of each can 2 in the case 3. The portions to be inspected of the can lid in such a case is shown in FIG. 14.

Figure 1:
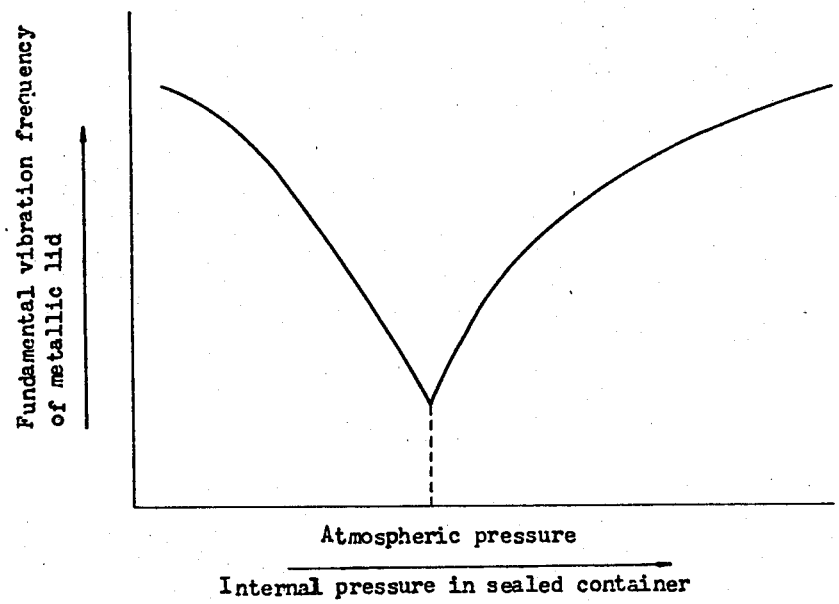
FIG. 1 illustrates the relationship between the internal pressure of a sealed container and fundamental vibration generated on the end surface of the sealed container.
Figure 14:
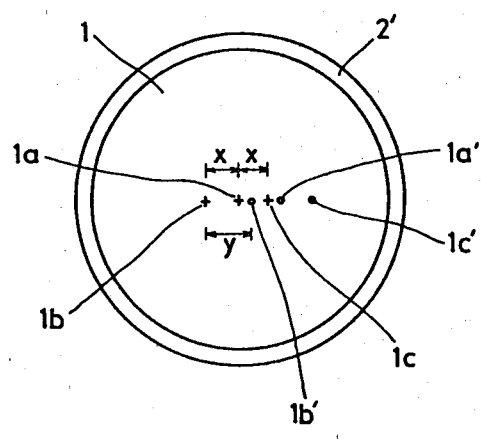
FIG. 14 illustrates the points to be inspected of the can lid where a pulse signal is given out three times in succession.
Figure 3:
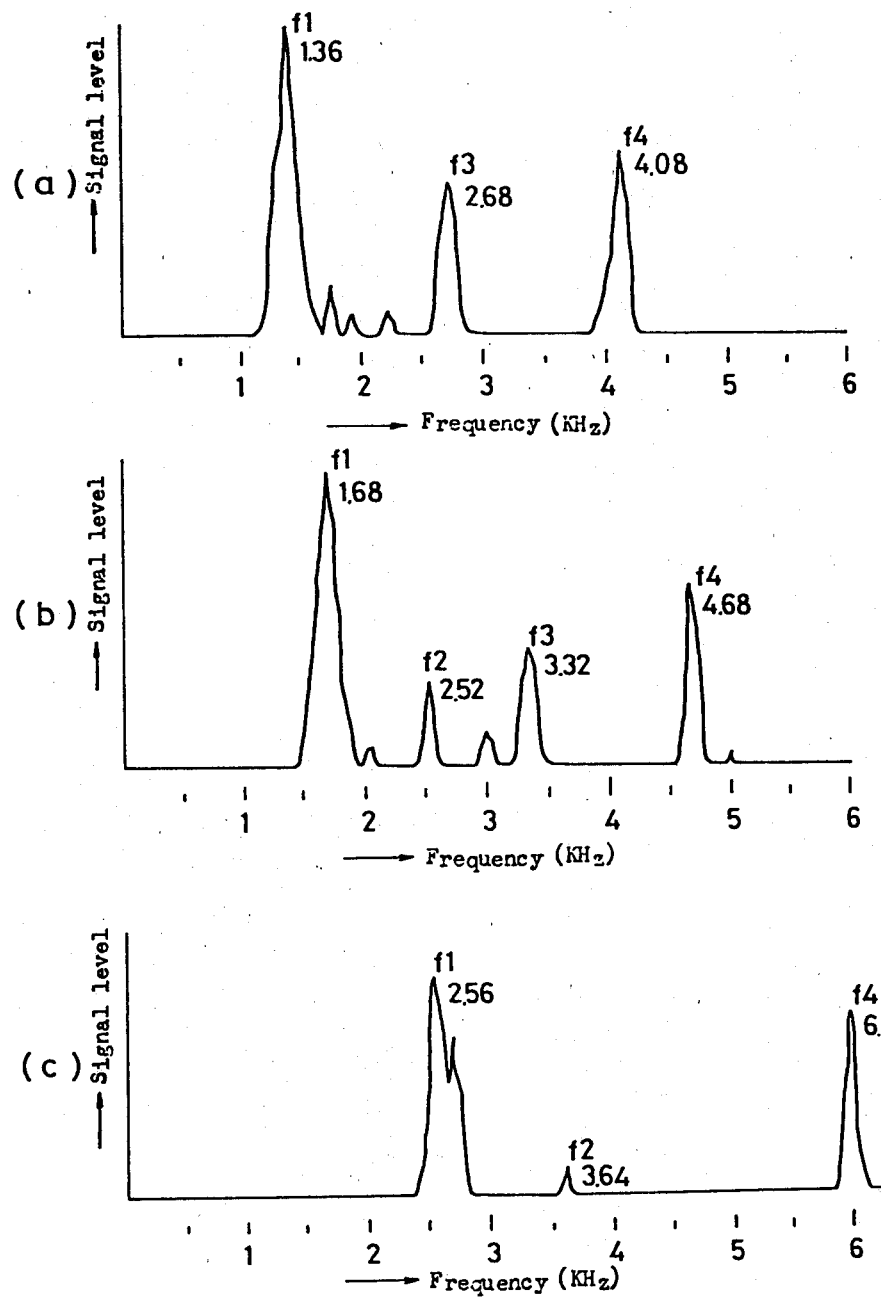

In FIG. 14, the point to be inspected 1a is the center of the end surface 1 of a can and the points 1b and 1c are points to be normally repeatedly inspected with the pitch x with the movement of the case 3. The outer periphery of the can 2 is generally designated by 2'. The points 1a', 1b' and 1c' are positionally shifted points to be inspected. Where an inspection number n is 3 and the pitch x between the positions to be repeatedly inspected is 5 mm, the maximum allowable positional shift of the can 2 becomes $\pm y = x/2 \times n = \pm 7.5$ mm, in order to maintain the positional error of the point to be inspected closest to the center 1a from the center 1a, as $x/2 = 2.5$ mm or less. That is, if the positional shift of the can 2 with respect to the case moving direction is maintained within 15 mm, it means that the positional error of the point to be inspected closest to the center 1a from the center 1a is maintained as 2.5 mm or less. Actually, it is possible to set the positional shift to such extent.

In order to prevent the positional shift in the transverse direction, guides are disposed at the both sides of the case 3. When a compressive force is slightly exerted to such guides, the gaps between the cans 2 are minimized, so that the positional errors of the cans 2 may readily be reduced to a practically allowable positional error.

Each time a pulse signal S1 is given out to a selected can 2, the highest level PLm is compared with the standard level PS at the step I, in the same manner as mentioned earlier. At the step II, the fundamental frequency is extracted. At the step III, the signal level PL is detected. Then, in order to detect the center of the end surface 1, the frequencies FLm' and FLm of the fundamental frequency component detector 27a are compared with each other and the signal level PL' of the higher frequency obtained from such comparison is detected. At the step VII, the ratio of the signal level PL at the lower frequency detected at the step III, to the signal level PL', or PL'/PL, is calculated.

Figure 15:
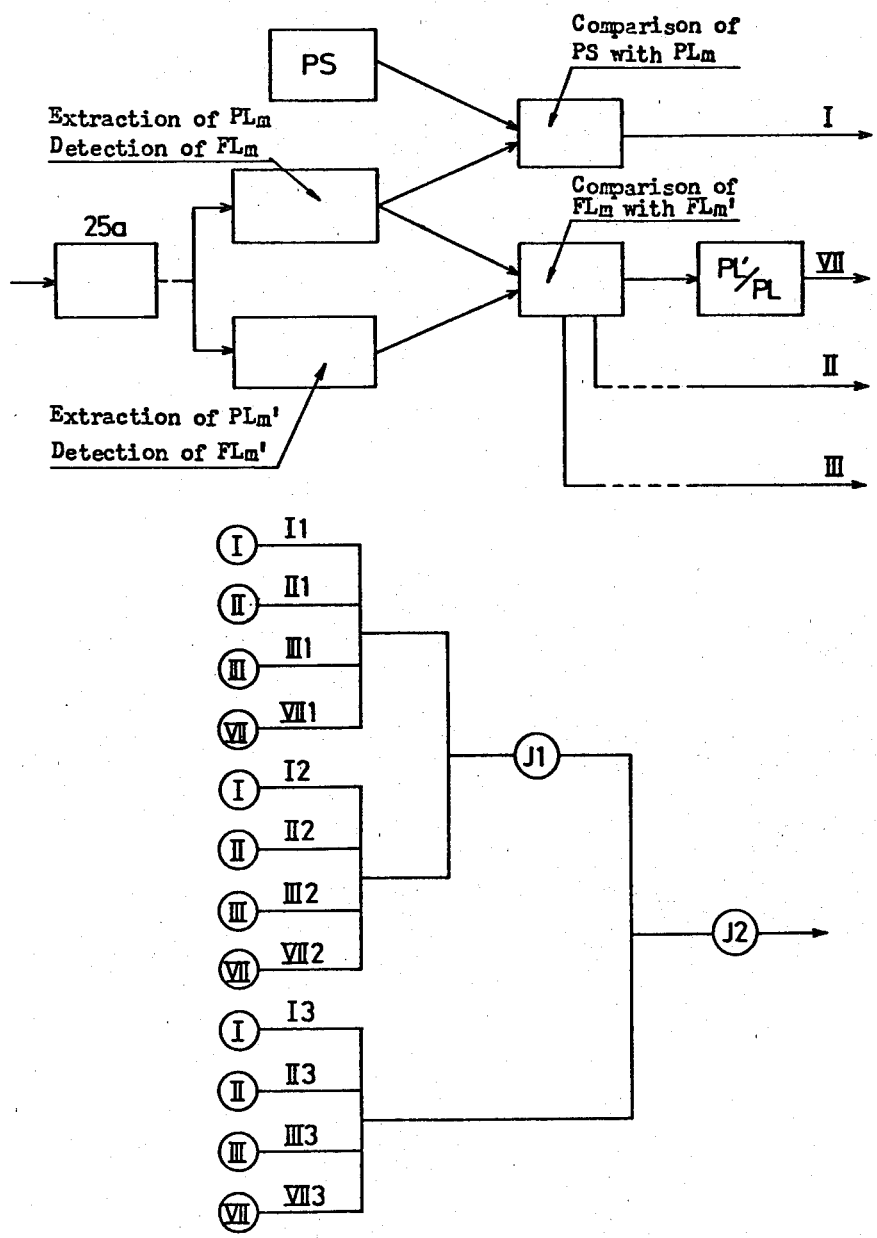
FIG. 15 is a schematic diagram illustrating the judging conditions where a pulse signal is given out three times in succession.

A pulse signal S1 is then given out three times to a subsequently selected can 2 in succession. Then, as shown in FIG. 15, there are obtained first data I1, II1, III1 and VII1, second data I2, II2, III2 and VII2 and third data I3, II3, III3 and VII3 at the steps I, II, III and VII, respectively.

Figure 4:
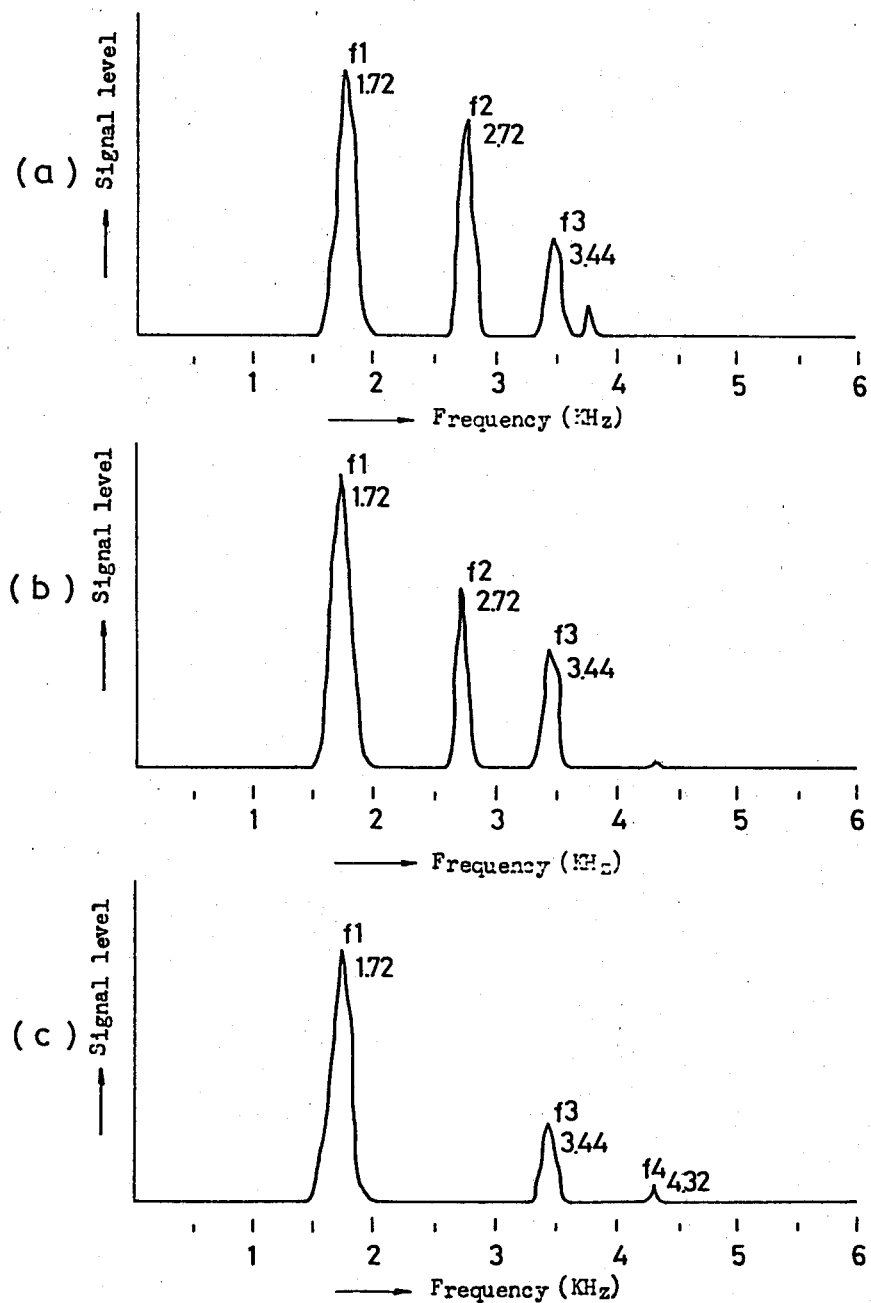
FIG. 4 to FIG. 6 illustrate the wave-forms of electric signals obtained with an electromagnetic force impinged on the portions apart from the centers of cans, respectively.
Figure 5:
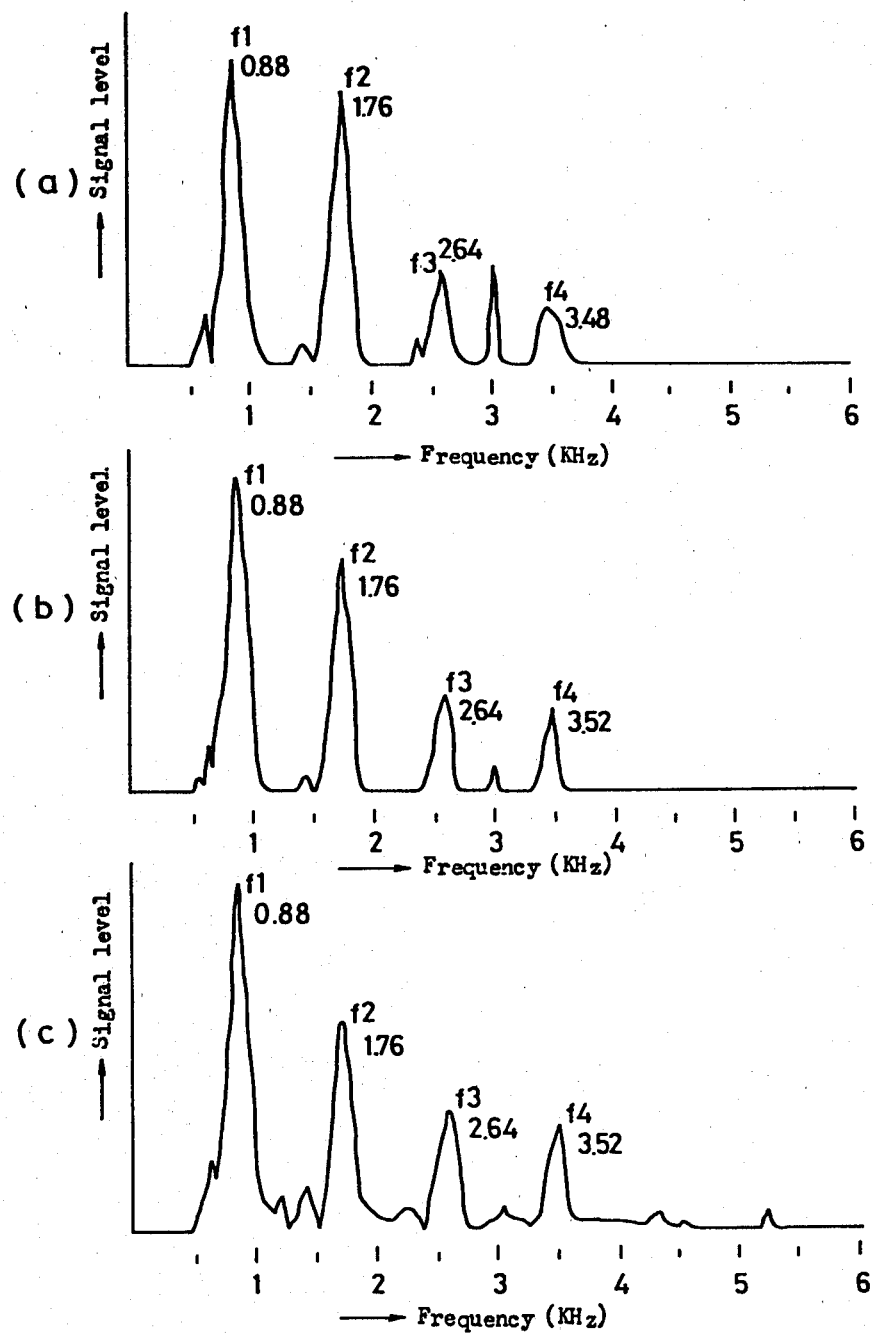
Figure 6:
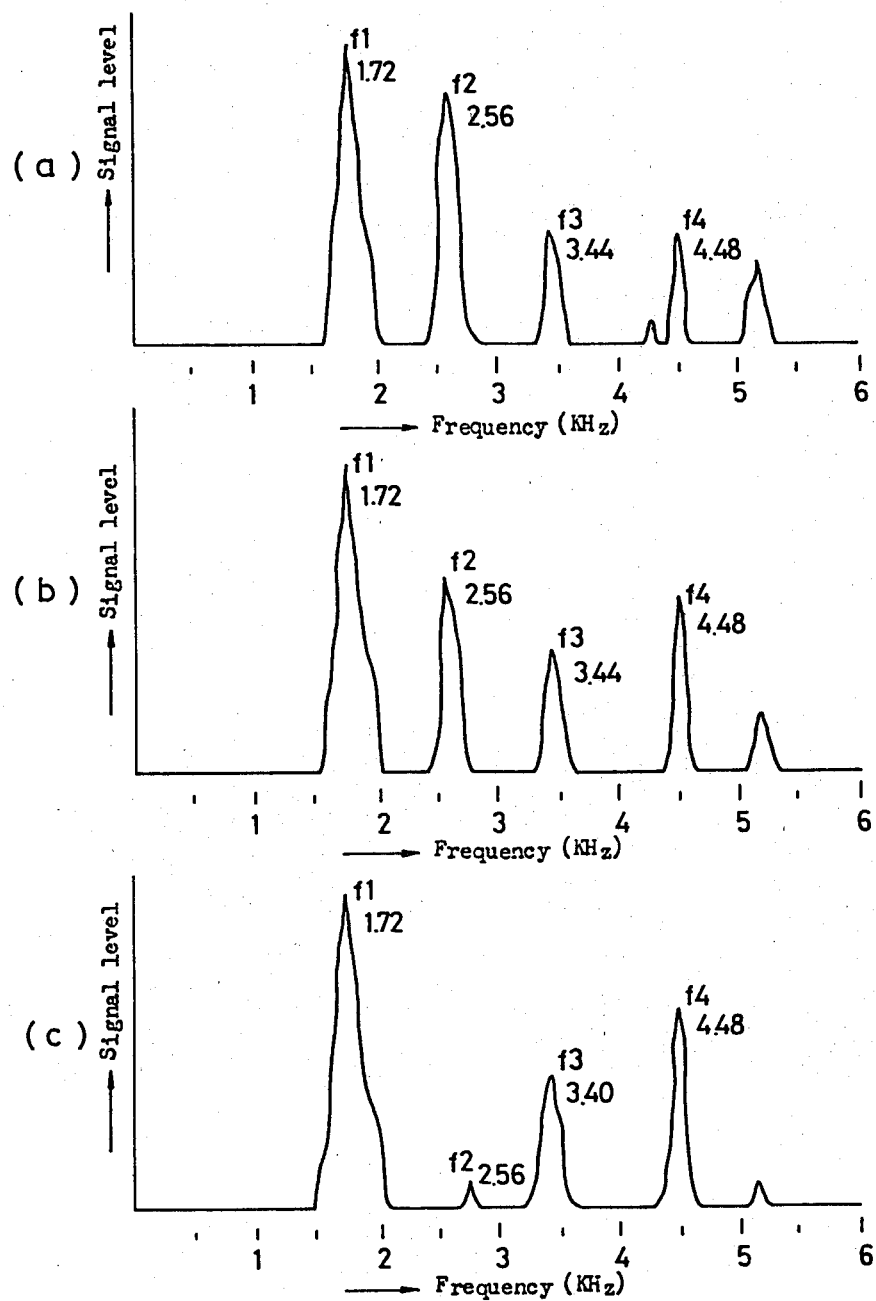

When PS is smaller than PLm in both data I1 and I2 at the step J1, the smaller data out of the data VII1 and VII2, or the data obtained from the position closer to the center position out of first and second data, is selected as Ija, IIja, IIIja and VIIja, taking into consideration the fact that the point to be inspected becomes closer to the center position as the ratio of PL'/PL calculated at the step VII becomes smaller, as apparent from FIGS. 4 to 6.

When PS is equal to or larger than PLm in either data I1 or I2, namely, either data represent that the can is defective, such data representing that the can is defective is selected and the display signal S6 and the rejection signal S7 are given out from the overall judging circuit 31.

When PS is smaller than PLm in the data I3 at the step J2, the smaller data out of the data VII3 and VIIja, or the data obtained from the position closest to the center position out of three data, are selected as Ijb, IIjb, IIIjb and VIIjb and a judgment is made by the overall judging circuit 31.

When PS is equal to or larger than PLm in the data I3, namely the can is defective, the display signal S6 and the rejection signal S7 are given out from the overall judging circuit 31.

INDUSTRIAL UTILITY

As thus discussed hereinbefore, the method of inspecting the internal pressures in sealed containers or cans in accordance with the present invention, permits detection of not only cans having no negative pressures but also cans having slightly insufficient negative pressures, in addition to the detection of expanded cans due to defective integration of can lids with can bodies or cans exhibiting abnormal vibration on the can lid surfaces due to deformation, substantially without influence by external conditions such as noisy vibrations in the manufacturing lines.

Thus, the method of the present invention permits detection of sealed containers which have been conventionally considered as not-detectable and to detect automatically and externally sealed containers as housed in moving cases, so as to check their internal pressures in an accurate and stable manner, whereby a satisfactory and stable inspection may be performed.

What we claim:
1. A method of inspecting the internal pressures in sealed containers comprising the steps of:
 exerting an impulsive force to a metallic end surface of each sealed container;
 detecting vibration of the end surface of said sealed container generated by said impulsive force, by means of one of a plurality of vibration detectors;
 supplying an output electric signal of said detector to a plurality of band-pass filters having substantially adjacent pass-bands;
 comparing the levels of the output signals of said band-pass filters;
 selecting two filters through which signals having the highest and second highest levels based on such comparison, pass;
 designating the signal passing through the filter having a lower frequency out of said two filters, as a fundamental frequency signal;
 selecting the filter having a frequency equivalent to a value obtained by multiplying the frequency of said fundamental frequency signal by a specific numeral from 2 to 3;
 designating the signal passing through said last-mentioned filter, as a higher harmonic signal; and
 judging said sealed container as defective when said fundamental frequency signal and said higher harmonic signal are applicable to at least one of following conditions;

(a) the level of said fundamental frequency signal is smaller than a predetermined standard level;

(b) the frequency of said fundamental frequency signal deviates from a predetermined frequency range; and (c) the ratio of said higher harmonic signal level to said fundamental frequency signal level is larger than a predetermined standard ratio.

2. The method of inspecting the internal pressures of sealed containers as set forth in claim 1, wherein the step of exerting an impulsive force comprises:

providing an exciting coil for exerting an electromagnetic impulsive force to the metallic end surface of each sealed container to generate natural damped vibration on said metallic end; and providing a permanent magnet or bias coil disposed adjacent said end surface;

and the step of vibration detection comprises:

providing a search coil for producing an electric signal representing the change in the magnetic flux, said method further comprising the steps of:

extracting and amplifying a natural signal generated by the natural damped vibration based on an electric signal of said search coil, by a wave-form shaping amplifier circuit;

supplying said amplified signal to a low-pass frequency filter group and a high-pass frequency filter group, in each of which a plurality of band-pass filters are disposed;

extracting the highest level signal and second highest level signal which have passed through said low-pass frequency filter group, by a fundamental frequency component detector;

comparing said highest level with a predetermined standard level;

judging, by a fundamental frequency judging circuit, whether or not the frequency of said fundamental frequency signal is within a predetermined range;

multiplying the frequency of said fundamental frequency signal by a numeral from 2 to 3, by a frequency computing circuit;

extracting, from said high-pass frequency filter group, a higher harmonic signal equivalent to the output frequency of said frequency computing circuit, by a higher harmonic component detector;

supplying said extracted higher harmonic signal to a level comparing circuit;

comparing, by said level comparing circuit, the level of said higher harmonic signal with a value obtained by multiplying the level of said fundamental frequency signal by a specific multiplying ratio; and producing an output signal representing that said sealed container is defective, by an overall judging circuit to which the outputs of said fundamental frequency component detector, said fundamental frequency judging circuit and said level comparing circuit are supplied.

3. The method of inspecting the internal pressures in sealed containers as set forth in claim 2, further comprising the steps of:

conveying cases in each of which a plurality of sealed containers are housed, by a conveyor;

disposing a detector unit having a plurality of vibration detectors, on said conveyor;

supplying a pulse current selectively to said exciting coils by a pulse generation power unit to generate a natural damped vibration on the end surfaces of said sealed containers in succession; and rejecting cases which house sealed containers judged as defective, according to rejection signals produced by the overall judging circuit.

* * * * *